(12) United States Patent
Takeuchi et al.

(10) Patent No.: US 6,739,099 B2
(45) Date of Patent: May 25, 2004

(54) COLUMN-AND-BEAM JOIN STRUCTURE

(75) Inventors: Toru Takeuchi, Tokyo (JP); Yasushi Maeda, Tokyo (JP); Kazuaki Suzuki, Tokyo (JP); Ken Okada, Kanagawa (JP); Satoshi Yamada, Koganei (JP); Akira Wada, Yokohama (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/163,475

(22) Filed: Jun. 5, 2002

(65) Prior Publication Data

US 2002/0184836 A1 Dec. 12, 2002

(30) Foreign Application Priority Data

Jun. 6, 2001 (JP) .......................... 2001-170432
Dec. 25, 2001 (JP) .......................... 2001-391061

(51) Int. Cl.$^7$ .............................. E04B 1/98; E04H 9/02
(52) U.S. Cl. .................... 52/167.1; 52/289; 403/403
(58) Field of Search ............... 52/167.1, 289, 52/650.1, 736.2, 737.1, 236.6, 655.1, 714; 403/403, 262, 187, 408.1, 174

(56) References Cited

U.S. PATENT DOCUMENTS

| | | | | |
|---|---|---|---|---|
| 4,905,436 A | * | 3/1990 | Matsuo et al. | 52/252 |
| 6,032,431 A | * | 3/2000 | Sugiyama | 52/656.9 |
| 6,059,482 A | * | 5/2000 | Beauvoir | 403/262 |
| 6,474,901 B1 | * | 11/2002 | Thurston | 403/381 |
| 6,474,902 B1 | * | 11/2002 | Beauvoir | 403/403 |
| 6,591,572 B2 | * | 7/2003 | Müürmann | 52/656.9 |

FOREIGN PATENT DOCUMENTS

| | | |
|---|---|---|
| JP | 7-102635 | 4/1995 |
| JP | 8-4112 | 1/1996 |
| JP | 8-151686 | 6/1996 |
| JP | 11-299493 | 8/1999 |
| JP | 2000-192547 | 7/2000 |
| JP | 2001-32369 | 2/2001 |

* cited by examiner

Primary Examiner—Jeanette Chapman
(74) Attorney, Agent, or Firm—Kenyon & Kenyon

(57) ABSTRACT

The present invention provides a column-and-beam join structure which absorbs energy caused by a large earthquake or the like by split tees surely yielding at a prescribed value, does not cause other members to fracture, and thus makes it possible to replace only the split tees which have become unusable, and, more specifically, a column-and-beam join structure constructed by attaching and connecting, using bolts 9, the ends 8*a* of both the upper and lower flanges 8 of a steel beam (H-shaped steel beam) 7 between the webs 6 of a pair of upper and lower split tees 4 the flanges 5 of which are connected to a steel column 1 using bolts 3. The upper limit of the yield stress of the steel material used for the split tees 4 is defined to be not more than twice the lower limit thereof. Further, in order for the web 6 extending from the flange 5 of a split tee 4 in the axial direction of an H-shaped steel beam 7 to absorb earthquake energy by its plasticization, the cross-sectional area of the web 6 is reduced partially and the base end portion 6*a* of the web 6 is divided from the tip portion 6*b* which is connected to the flange 8 of the H-shaped steel beam 7.

6 Claims, 18 Drawing Sheets

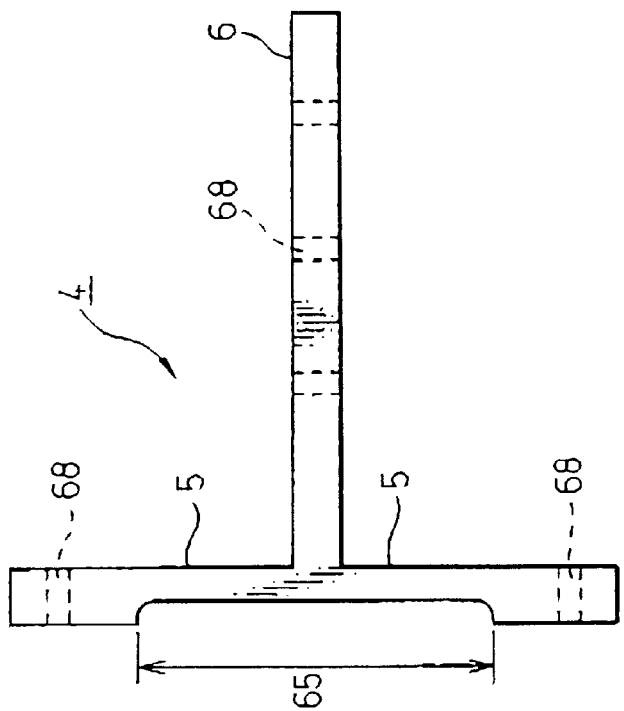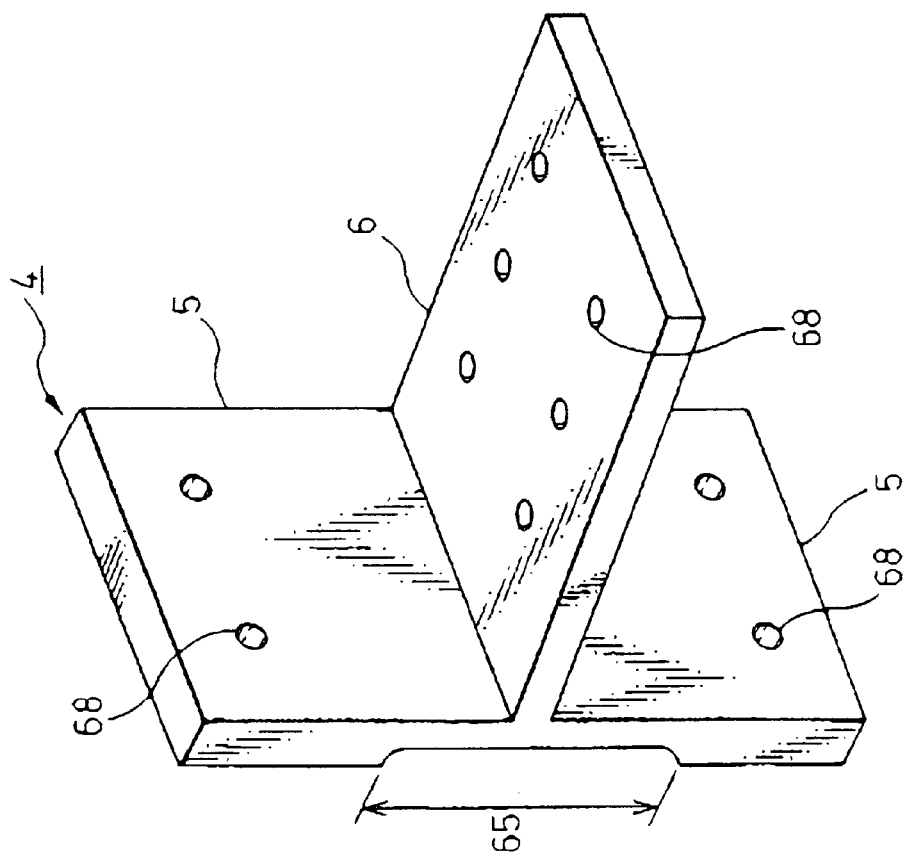

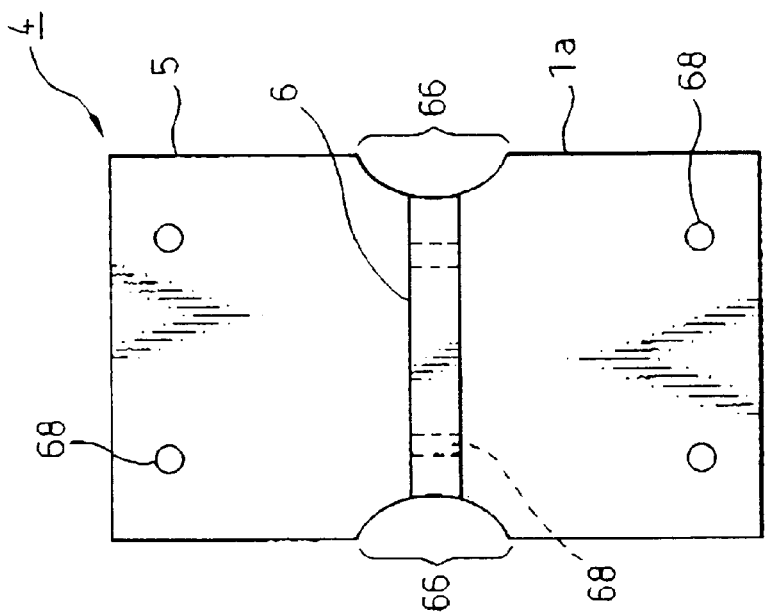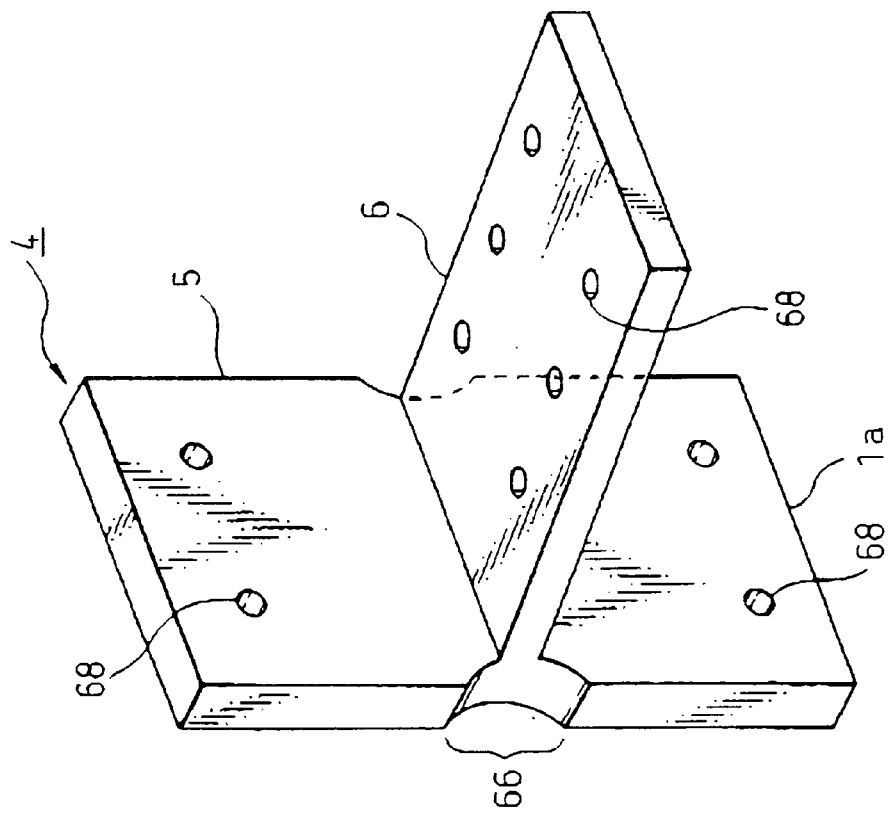
Fig.14(a)
Fig.14(b)

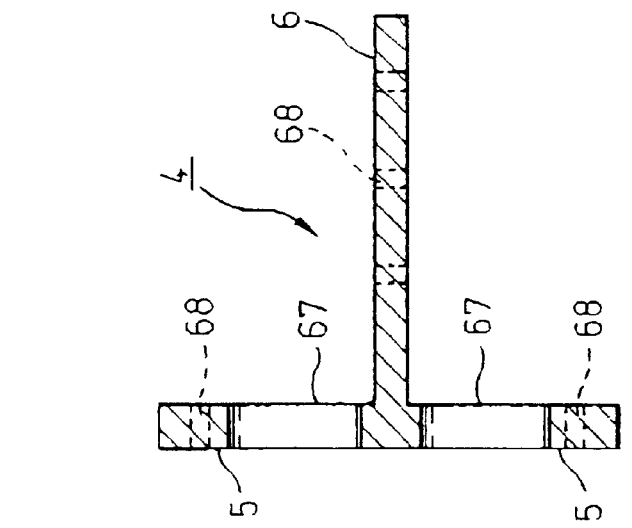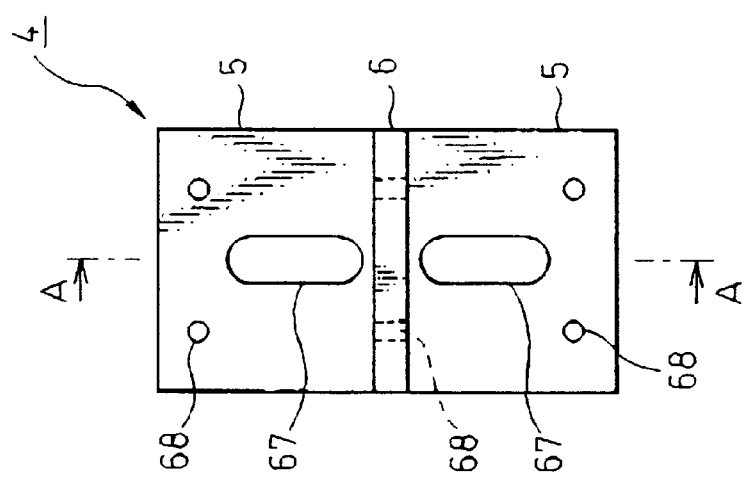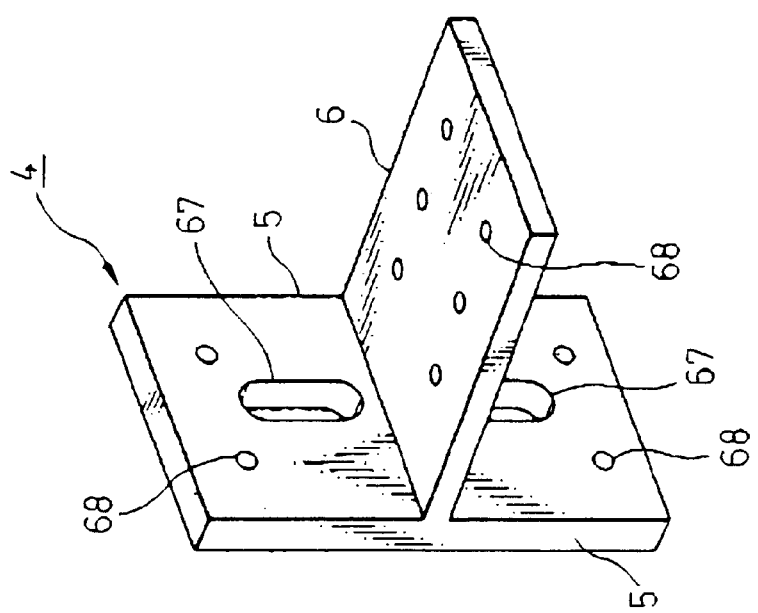

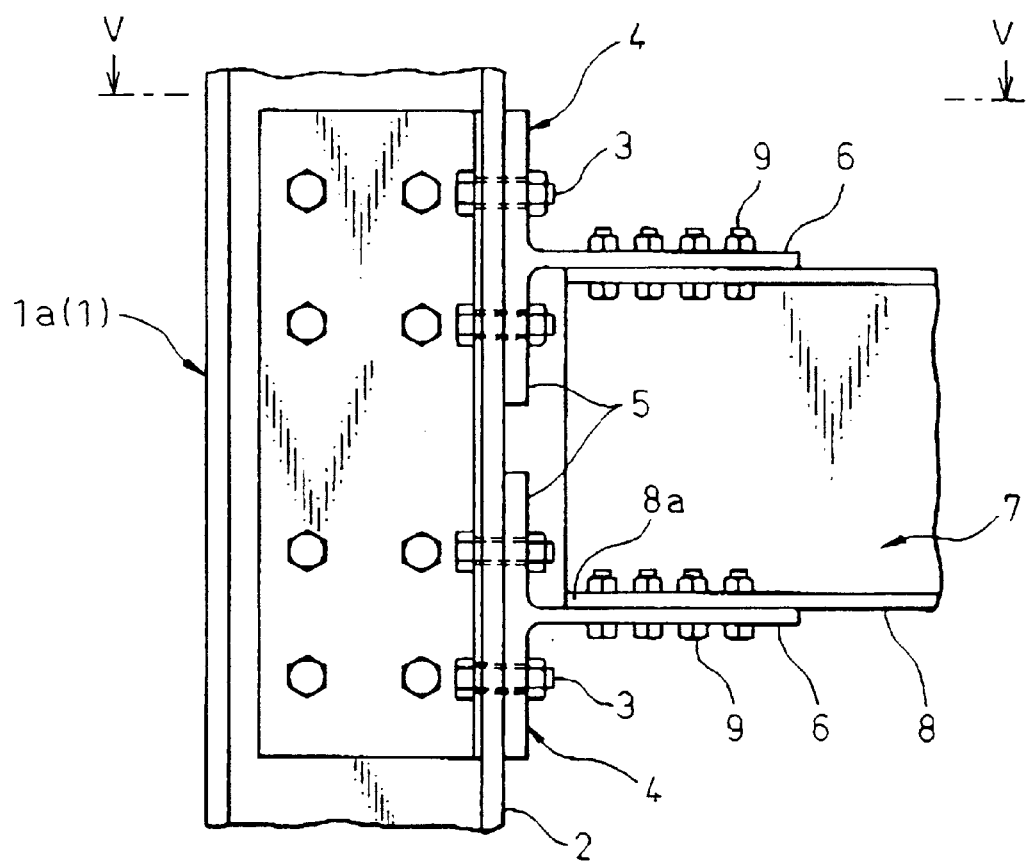

COLUMN-AND-BEAM JOIN STRUCTURE

TECHNICAL FIELD

The present invention relates to a column-and-beam join structure having a vibration-mitigating property in a steel frame when a steel structure building is constructed and, more specifically, to a column-and-beam join structure capable of absorbing the energy of an earthquake by split tees yielding before the column and the beam in a column-and-beam join structure which is made of a steel column and a steel beam using split tees.

In a column-and-beam join structure according to the present invention, the steel column includes not only an H-shaped steel column or a square steel tube column but also a column of any cross-sectional shape which may be connected using split tees, and the steel beam includes not only an H-shaped steel beam but also a section beam of an L-shape, a T-shape, or another shape in cross section, which may be connected using split tees.

BACKGROUND ART

When a steel column and a steel beam are connected in a steel structure building, there are cases where split tees of, for example, a T-shape (or an L-shape) are used. In such a column-and-beam join structure, in order to form a final collapse system at the time of a large earthquake or the like, when a square steel tube column is used as a steel column, the column-and-beam join structure is generally designed so as to cause the column to yield by applying a bending deformation, such as bulging or concaving a side wall of the column to which split tees are connected in accordance with a tension or a compression imposed thereon from the portion to which the beam is connected. However, since the flexural strength of the flanges of the split tees is critical in design, the thickness and width of the flanges must be increased in order to sufficiently secure the rigidity and proof stress of the flanges, and therefore it is not economical.

Further, in Japanese Unexamined Patent Publication No. H11-229493 or H7-102635, as shown in FIGS. 19 and 20, a column-and-beam join structure is proposed wherein: an H-shaped steel column 1a(1) is used as a steel column 1; the flanges 5 of a pair of upper and lower split tees 4 are connected to a flange 2 of the H-shaped steel column 1a(1) using bolts 3; the end portions 8a of both the upper and lower flanges 8 of an H-shaped steel beam 7 used as a steel beam are assembled between the webs 6 of both the upper and lower split tees 4 and are connected to the webs 6 using bolts 9. In such a column-and-beam join structure, as shown in FIG. 21, if a tension F, which is imposed from the join portion of a flange 8 of the H-shaped steel beam 7, is applied to the flange 5 of a split tee 4: the flange 5 undergoes bending deformation while bulging so as to separate from the face of a flange 2 of the H-shaped steel column 1a(1); with the bending deformation of the flange 5, the bolts 3 used for connecting the flange 5 to the flange 2 of the H-shaped steel column 1a(1) undergo a bending tension as shown in FIG. 21; the bolts 3 are prized, twisted and cut by the prying action; and thus the tension rupture of the bolts 3 constitutes a final collapse system. In such a case of the tension rupture of bolts as stated above, the column is sometimes damaged by the tension.

On the other hand, in the case of designing a final collapse system for a large earthquake or the like, it is not desirable to make the join portions of a steel column and split tees rupture, and therefore it is an original technique to design the system so as to impose all cross-sectional proof stress on a steel beam so that the rupture may occur in the steel beam itself. However, the yield stress itself of a steel material used for a beam is controlled with only the lower limit of the yield stress. Therefore, even though a system is designed so as to impose all cross-sectional proof stress on a beam, since there are cases where the proof stress of the beam is excessively large, the rupture may occur in bolts, split tees or the portion to which a column is connected, which have no allowance in proof stress, as a result.

Considering the absorption of earthquake energy by a column-and-beam join portion based on the above discussion, in the case where a rupture occurs by the bending deformation of the flange of a split tee, even though the flange bulges for example, the flange sticks closely to the join face of a column finally and therefore the tension and the compression do not become symmetrical and, in the case where a rupture occurs by the tension rupture of bolts, a gap is gradually generated between the face of a column and the face of the flange of the split tee where they are connected by bolts and therefore both loops of tension and compression cannot be obtained when the bolts are plasticized, and, in either of the cases, the deformation develops in one direction and therefore the present situation is that, though the present technique can cope with the design on the proof stress of the split tee, the design of the split tee is not a design capable of coping with the absorption of earthquake energy.

Japanese Unexamined Patent Publication No. 2001-32369 discloses a technology wherein the flange of a split tee is used as an energy absorbing member by making the bending yield of the flange of the split tee precede the tension yield of bolts. However, in the case where the web of a split tee undergoes tension, this technology is effective, but, in the case where the web undergoes compression, energy absorption cannot be expected and, therefore, there is a room for further improvement.

Further, there presently is a column-and-beam join structure constructed by directly welding the ends of both the upper and lower flanges of an H-shaped steel beam to a steel column. However, such conventional method has a drawback of generating a rupture caused by the welding portion of a steel column and an H-shaped steel beam becoming a critical portion.

Thus, at present, in order to prevent a rupture at a weld portion of a steel column and an H-shaped steel beam, as disclosed in Japanese Unexamined Patent Publication No. H8-4112 for example, notches are formed on both sides adjacent to the edges of both the upper and lower flanges of an H-shaped steel beam which is directly welded to a steel column and, by so doing, the portions having the function of absorbing earthquake energy are provided, so that the portions of the H-shaped steel beam except the portions which are welded to the steel column can yield positively. However, when the portions having the function of absorbing earthquake energy are ruptured by a large earthquake or the like and the portions cannot be reused, as the portions having the function of absorbing earthquake energy are welded to the steel column and it is basically impossible to replace the portions having the function of absorbing earthquake energy after the rapture. Therefore, in reality, the steel structure building has to be reconstructed even though the H-shaped steel beam is not ruptured.

In the meantime, disclosed in Japanese Unexamined Patent Publication No. 2000-192547 is a column-and-beam join structure which is provided with an energy absorbing function by reinforcing the end of the lower flange of an H-shaped steel beam which is welded to a steel column via a diaphragm with a beam supporting reinforcing member which is composed of extra mild steel and welded to the steel column, and disclosed in Japanese Unexamined Patent Publication No. H8-151686 is a column-and-beam join structure which is provided with an energy absorbing function by welding ribs composed of a metal material having a lower yield stress than that of a material used for a column or a beam to both the upper and lower flanges of an H-shaped steel beam and by rigidly connecting the steel column to the H-shaped steel beam via the upper and lower ribs. However, when a beam supporting reinforcing member or a portion having an energy absorbing function is ruptured by a large earthquake or the like and becomes hardly reusable, it is impossible to replace the relevant portion only.

The present invention is accomplished in view of the drawbacks of the existing technologies as stated above, and the object thereof is: to provide a column-and-beam join structure capable of plasticizing split tees in advance of a steel beam or a steel column by using split tees which can secure energy absorption without welding the join portions of a steel column and a steel beam and further by granting an energy absorbing function to the webs of the split tees, which are connected to the steel beam using bolts, or to the flanges of the split tees, which are connected to the steel column using bolts, so that the energy caused by a large earthquake or the like can efficiently be absorbed; and further to provide a column-and-beam join structure wherein the replacement and reconstruction of a steel column or a steel beam, which have been required up to now, are not required by making it easier to replace only the split tees which are not reusable due to a large earthquake.

SUMMARY OF THE INVENTION

The present invention is accomplished aiming at the above object and is constructed as follows:

The first invention is a column-and-beam join structure fabricated by connecting the flanges of split tees to a steel column using bolts and by engaging and connecting the webs of the split tees to the ends of the flanges of a steel beam using bolts, characterized by making either one or both of the web and the flange of a split tee yield in advance of the column or the beam.

The second invention is a column-and-beam join structure fabricated by connecting the flanges of split tees to a steel column using bolts and by engaging and connecting the webs of the split tees to the ends of the flanges of a steel beam using bolts, characterized in that the upper limit of the yield stress of the steel material used for either one or both of the web and the flange of a split tee is defined to be not more than twice the lower limit thereof.

The third invention is a column-and-beam join structure fabricated by connecting the flanges of split tees to a steel column using bolts and by engaging and connecting the webs of the split tees to the ends of the flanges of a steel beam using bolts, characterized in that a split tee has a shape wherein the cross-sectional area of the web is partially reduced so as to divide the base end portion of the web, the web extending from the flange of a split tee in the axial direction of the steel beam material, from the tip portion thereof to which a flange of the H-shaped steel beam is connected using bolts.

The fourth invention is a column-and-beam join structure according to the third invention, characterized in that the upper limit of the yield stress of the steel material used for the web of a split tee at the portion where the cross-sectional area is partially reduced is defined to be not more than twice the lower limit thereof.

The fifth invention is a column-and-beam join structure according to the third or fourth invention, characterized by placing the web, including the portion where the cross-sectional area of the web of a split tee is partially reduced, between a flange of the steel beam and a section steel for buckling restraint, and connecting the web to them using bolts.

The sixth invention is a column-and-beam join structure according to any one of the first to fourth inventions, characterized by providing reinforcing plates, which protrude in the direction of the web and not touching the web, to both the side edges of the flange of a split tee.

The seventh invention is a column-and-beam join structure according to the third or fourth invention, characterized by: providing reinforcing plates, which protrude in the direction of the web but do not touch the web, to both the side edges of the flange of a split tee; and placing the web, including the portion where the cross-sectional area of the web of a split tee is partially reduced, between a flange of the steel beam and a section steel for buckling restraint, and connecting the web to them using bolts.

The eighth invention is a column-and-beam join structure fabricated by connecting the flanges of split tees to a steel column using bolts and by engaging and connecting the webs of the split tees to the ends of the flanges of a steel beam using bolts, characterized in that: the upper limit of the yield stress of the steel material used for either one or both of the web and the flange of a split tee is defined to be not more than twice the lower limit thereof; and, at a portion where both ends of the flange of the split tee are connected to the steel column using bolts, space keeping members are inserted between the flange of the split tee and the steel column and the flange of the split tee and the steel column are connected in the state of maintaining the space.

The ninth invention is a column-and-beam join structure according to the eighth invention, characterized in that a split tee has a shape wherein the cross-sectional area of the flange is partially reduced.

The tenth invention is a column-and-beam join structure fabricated by connecting the flanges of a pair of upper and lower split tees to a steel column using bolts, by engaging and connecting both the upper and lower flanges of a steel beam between the webs of both the upper and lower split tees using bolts, and by molding a concrete slab to either one of both the upper and lower flanges of the steel beam, characterized in that: the yield stress of the steel material used for the web of the split tee, to which the flange of the steel beam where the concrete slab has been molded is connected, is defined to be higher than the upper limit of the yield stress of the steel material used for the web of the other split tee; and the upper limit of the yield stress of the steel material used for the web of the other split tee is defined to be not more than twice the lower limit thereof.

The eleventh invention is a column-and-beam join structure according to the tenth invention, characterized in that the other split tee has a shape wherein the cross-sectional area of the web is partially reduced.

The twelfth invention is a column-and-beam join structure fabricated by connecting the flanges of a pair of upper and lower split tees to a steel column using bolts and by engaging and connecting both the upper and lower flanges of a steel beam between the webs of both the upper and lower split tees using bolts, characterized in that: one of the upper and lower split tees has a shape wherein the cross-sectional area of the web is partially reduced and the upper limit of the yield stress of the steel material used for the web is defined to be not more than twice the lower limit thereof; and the yield stress of the steel material used for the web of the other of the upper and lower split tees is defined to be higher than the upper limit of the yield stress of the steel material used for the web of the former split tee.

The thirteenth invention is a column-and-beam join structure according to the eleventh or twelfth invention, characterized by placing the web, including the portion where the cross-sectional area of the web of a split tee is partially reduced, between a flange of the steel beam and a section steel for buckling restraint, and connecting the web to them using bolts The fourteenth invention is a column-and-beam join structure fabricated by connecting the flanges of a pair of upper and lower split tees to a steel column using bolts, by engaging and connecting both the upper and lower flanges of a steel beam between the webs of both the upper and lower split tees using bolts, and by molding a concrete slab to either one of both the upper and lower flanges of the steel beam, characterized in that: the yield stress of the steel material used for the flange of the split tee, to which the flange of the steel beam where the concrete slab has been molded is connected, is defined to be higher than the upper limit of the yield stress of the steel material used for the flange of the other split tee; the upper limit of the yield stress of the steel material used for the flange of the other split tee is defined to be not more than twice the lower limit thereof; and, at a portion where both ends of the flange of the other split tee are connected to the steel column using bolts, space keeping members are inserted between the flange of the split tee and the steel column and the flange of the split tee and the steel column are connected in the state of maintaining the space.

The fifteenth invention is a column-and-beam join structure according to the thirteenth invention, characterized in that the other split tee has a shape wherein the cross-sectional area of the flange is partially reduced.

The sixteenth invention is a column-and-beam join structure fabricated by connecting the flanges of a pair of upper and lower split tees to a steel column using bolts and by engaging and connecting both the upper and lower flanges of a steel beam between the webs of both the upper and lower split tees using bolts, characterized in that: the upper limit of the yield stress of the steel material used for the flange of one of the upper and lower split tees is defined to be not more than twice the lower limit thereof; at a portion where both ends of the flange of the split tee are connected to the steel column using bolts, space keeping members are inserted between the flange of the split tee and the steel column and the flange of the split tee and the steel column are connected in the state of maintaining the space; and the yield stress of the steel material used for the flange of the other of the upper and lower split tees is defined to be higher than the upper limit of the yield stress of the steel material used for the flange of the former split tee.

The seventeenth invention is a column-and-beam join structure according to the sixteenth invention, characterized in that the former split tee has a shape wherein the cross-sectional area of the flange is partially reduced.

By the first invention, as at least one or both of the web and the flange of a split tee is plasticized in advance of a column and a beam, the split tee can absorb energy and also the rotation angle of the beam end can be quantified By so doing, the response reduction effect against an earthquake, a wind or the like can surely be enhanced and a collapse at an undesirable portion, such as the tension rupture of a bolt which has occurred up to now, can be prevented.

By the second invention, as the plasticization of the web portion of a split tee can surely precede that of a column and a beam, the web portion can absorb energy and also the rotation angle of the beam end can be quantified. By so doing, the response reduction effect against an earthquake, a wind or the like can surely be enhanced and a collapse at an undesirable portion, such as the tension rupture of a bolt which has occurred up to now, can be prevented.

By the third or fourth invention, as the plasticization of the web portion of a split tee can precede that of the other portions more surely than in the case of the second invention, the web portion can absorb energy and also the rotation angle of the beam end can be quantified. By so doing, the response reduction effect against an earthquake, a wind or the like can surely be enhanced and a collapse at an undesirable portion, such as the tension rupture of a bolt which has occurred up to now, can be prevented.

By the fifth invention, the portion where the cross-sectional area of the web of a split tee is reduced is reinforced and, when a tension and a compression are imposed on the web, the portion where the cross-sectional area of the web is reduced can be prevented from buckling locally in an off-plate direction on the compression side.

By the sixth invention, as the flange portion of a split tee is reinforced and the bending yield of the flange which has occurred up to now can be prevented, the plasticization of the web portion can precede that of the other portions more surely.

By the seventh invention, as the flange portion of a split tee is reinforced and the portion where the cross-sectional area of the web of the split tee is partially reduced is also reinforced, the bending yield of the flange is prevented and the plasticization of the web portion can precede that of the other portions and also, when a tension and a compression are imposed on the web, the portion where the cross-sectional area of the web is reduced can be prevented from buckling locally in an off-plate direction on the compression side.

By the eighth or ninth invention, as a space is formed between the flange of a split tee and a steel column at the center portion of the flange, even when an excessive stress is imposed in the direction where the web of the split tee is compressed, the energy can be absorbed by the split tee and the column is not damaged. Further, as the plasticization of the flange of the split tee can precede that of the other portions, the energy can be absorbed at the flange portion and also the rotation angle of the beam end can be quantified.

By so doing, the response reduction effect against an earthquake or a wind can be enhanced and a collapse at an undesirable portion, such as the tension rupture of a bolt, can be prevented.

By the tenth or eleventh invention, the rigidity of the flange side of an H-shaped steel beam, to which a concrete slab is molded, is enhanced, the center axis of the H-shaped steel beam moves toward the side to which the concrete slab is molded and, when a tension is imposed on the H-shaped steel beam, as the end of the H-shaped steel beam rotates around a center axis located in the vicinity of the web portion of the split tee which is connected using bolts to the flange side to which the concrete slab is molded, the split tee on the side to which the concrete slab is molded is not plasticized and the web portion of the other split tee to which the concrete slab is not molded is plasticized in advance of the other portions, and, therefore, a usual split tee can be used as the split tee on the side to which the concrete slab is molded. By so doing, since it becomes possible to replace only the other split tee which has become unusable due to a large earthquake or the like, the recovery work can be carried out simply and easily.

By the twelfth invention, a split tee located at one of the upper and lower column-and-beam join portions, which join portion is configured by using the split tee wherein the upper limit of the yield stress of the steel material used for the web is specified in a specific range and the web has a portion where the cross-sectional area of the web is partially reduced, yields in advance of the other split tee located at the other of the upper and lower column-and-beam join portions, which join portion is configured by using the split tee wherein the yield stress of the steel material used for the web is defined to be higher than the upper limit of the yield stress of the steel material used for the web of the former split tee. Therefore, the damage caused by the energy of an earthquake is concentrated on the former split tee. After the earthquake, the earthquake resistance of the building can easily be recovered by replacing the damaged split tee.

By the thirteenth invention, the portion where the cross-sectional area of the web of a split tee is reduced is reinforced and, when a tension and a compression are imposed on the web, the portion where the cross-sectional area of the web is reduced can be prevented from buckling locally in an off-plate direction on the compression side.

By the fourteenth or fifteenth invention, the rigidity of the flange side of a steel beam (H-shaped steel beam), to which a concrete slab is molded, is enhanced, the center axis of the steel beam moves toward the side to which the concrete slab is molded and, when a tension is imposed on the steel beam, as the end of the steel beam rotates around a center axis located in the vicinity of the flange portion of the split tee which is connected using bolts to the flange side to which the concrete slab is molded, the split tee on the side to which the concrete slab is molded is not plasticized and the flange portion of the other split tee to which the concrete slab is not molded is plasticized in advance of the other portions, and therefore a usual split tee can be used as the split tee on the side to which the concrete slab is molded. By so doing, since it becomes possible to replace only the other split tee which has become unusable caused by a large earthquake or the like, the recovery work can be carried out simply and easily.

By the sixteenth or seventeenth invention, a split tee located at one of the upper and lower column-and-beam join portions, which join portion is configured by using the split tee wherein the upper limit of the yield stress of the steel material used for the flange is specified in a specific range and the flange has a portion where the cross-sectional area of the flange is partially reduced, yields in advance of the other split tee located at the other of the upper and lower column-and-beam join portions, which join portion is configured by using the split tee wherein the yield stress of the steel material used for the flange is defined to be higher than the upper limit of the yield stress of the steel material used for the flange of the former split tee. Therefore, the damage caused by the energy of an earthquake is concentrated on the former split tee. After the earthquake, the earthquake resistance of the building can easily be recovered by replacing the damaged split tee.

Furthermore, as the integrated effect of the above inventions, in the case where a large earthquake occurs for example, by making the portion of a split tee, to which a column and a beam are connected, yield in advance of the column and thus concentrating the damage at the split tee only, even when the portion of the split tee becomes unusable after the earthquake, the earthquake resistance of the building can be recovered by replacing the split tee. When an earthquake-resistant design is applied to a column and a beam, it is preferable in the design to make the beam (or split tee in the present invention) yield in advance of the column, but, since the design is usually implemented adopting the lower limit of the yield stress of a steel material as the proof stress of the design, the actual yield stress of the steel material is higher than the designed proof stress. Therefore, even though a load which is expected to cause yield in a design is imposed, there may be some cases where the portion does not yield. For instance, even though a structure is designed so as to make a split tee yield in advance of a column, if the yield stress of the steel material used for the split tee is higher than a designed proof stress, there may be some cases where the column yields in advance.

The present invention makes it possible to design a join wherein a split tee yields in advance of a column surely by regulating the upper limit of the yield stress of a steel material used for the split tee and defining the upper limit of the yield stress as the proof stress for designing. Further, the narrower the regulated range of the yield stress of a steel material is, the more the cross-sectional area of a column can be reduced and, therefore, an economical design can be realized.

Explanations will further be done referring to FIG. 18. FIGS. 18(*a*) to 18(*c*) show the relation between the stress ($\sigma$:N/mm$^2$) and the strain ($\epsilon$) with respect to the three kinds of steel materials which are assumed to be used for split tees.

FIG. 18(*a*) shows the case where a split tee produced from a conventional steel material (SS material: JISG3101, etc.) is used. In this case, if the lower limit of the yield stress ($\sigma$ min) of a steel material is defined to be the yield stress in design, as the upper limit of the yield stress ($\sigma$ max) is not regulated, it sometimes happens that a steel material having a very high yield stress is used and a column tends to yield in advance. In the case where an SN material (JISG3106) is assumed to be used for a split tee as shown in FIG. 18(*b*), the upper limit of the yield stress of the material is 1.35 to 1.5 times the lower limit of the yield stress. In the case where a steel material developed by the present inventors is used for a split tee as shown in FIG. 18(*c*), the upper limit of the yield stress of the material is 1.2 times the lower limit of the yield stress. In this case, the regulated range of the yield stress of the split tee is narrow and it is possible to make the split tee yield surely at the web or the flange thereof in advance of the column, and thus the effectiveness of the present invention is confirmed.

The portions of a split tee used in the present invention may be made of the same steel material having the same yield stress. However, to obtain the effect of the present invention, at least the web or the flange of a split tee may be made of a steel material having the material properties according to the preset invention.

BRIEF DESCRIPTION OF THE DRAWINGS

FIG. 6(*b*) is a sectional view taken on line III—III of FIG. 6(*a*) showing the second embodiment of a column-and-beam join structure according to the present invention.

FIG. 7(*b*) is a sectional view taken on line IV—IV of FIG. 7(*a*) showing the third embodiment of a column-and-beam join structure according to the present invention.

FIG. 10(*b*) is a sectional view taken on line II—II of FIG. 10(*a*) showing another embodiment of a column-and-beam join structure according to the present invention.

FIG. 12(*b*) is a perspective view showing the lower column-and-beam join portion (one of the upper and lower column-and-beam join portions) in FIG. 12(*a*) showing the fourth embodiment of a column-and-beam join structure according to the present invention.

FIG. 13(*a*) is a perspective view showing a split tee wherein the thickness of the flange is partially reduced.

FIG. 13(*b*) is a side view showing a split tee wherein the thickness of the flange is partially reduced.

FIG. 14(*a*) is a perspective view showing a split tee wherein notches are formed on both sides of the flange.

FIG. 14(*b*) is a front view of FIG. 14(*a*) showing a split tee wherein notches are formed on both sides of the flange.

FIG. 15(*a*) is a perspective view showing a split tee wherein holes are formed in the flange.

FIG. 15(*b*) is a front view of FIG. 15(*a*) showing a split tee wherein holes are formed in the flange.

FIG. 15(*c*) is a sectional view taken on line A—A of FIG. 15(*b*) showing a split tee wherein holes are formed in the flange.

FIG. 17(*b*) is a top view of FIG. 17(*a*) showing an example of attaching a split tee between the flanges of an H shaped steel column at a column-and-beam join portion according to the present invention.

FIG. 18(*b*) is another graph explaining the upper limit and lower limit of a yield stress in the relation between the stress and the strain of a steel material used for a split tee.

FIG. 18(*c*) is yet another graph explaining the upper limit and lower limit of a yield stress in the relation between the stress and the strain of a steel material used for a split tee.

FIG. 19 is a side view of a main part showing a conventional column-and-beam join structure.

THE MOST PREFERRED EMBODIMENTS

Figure 1:
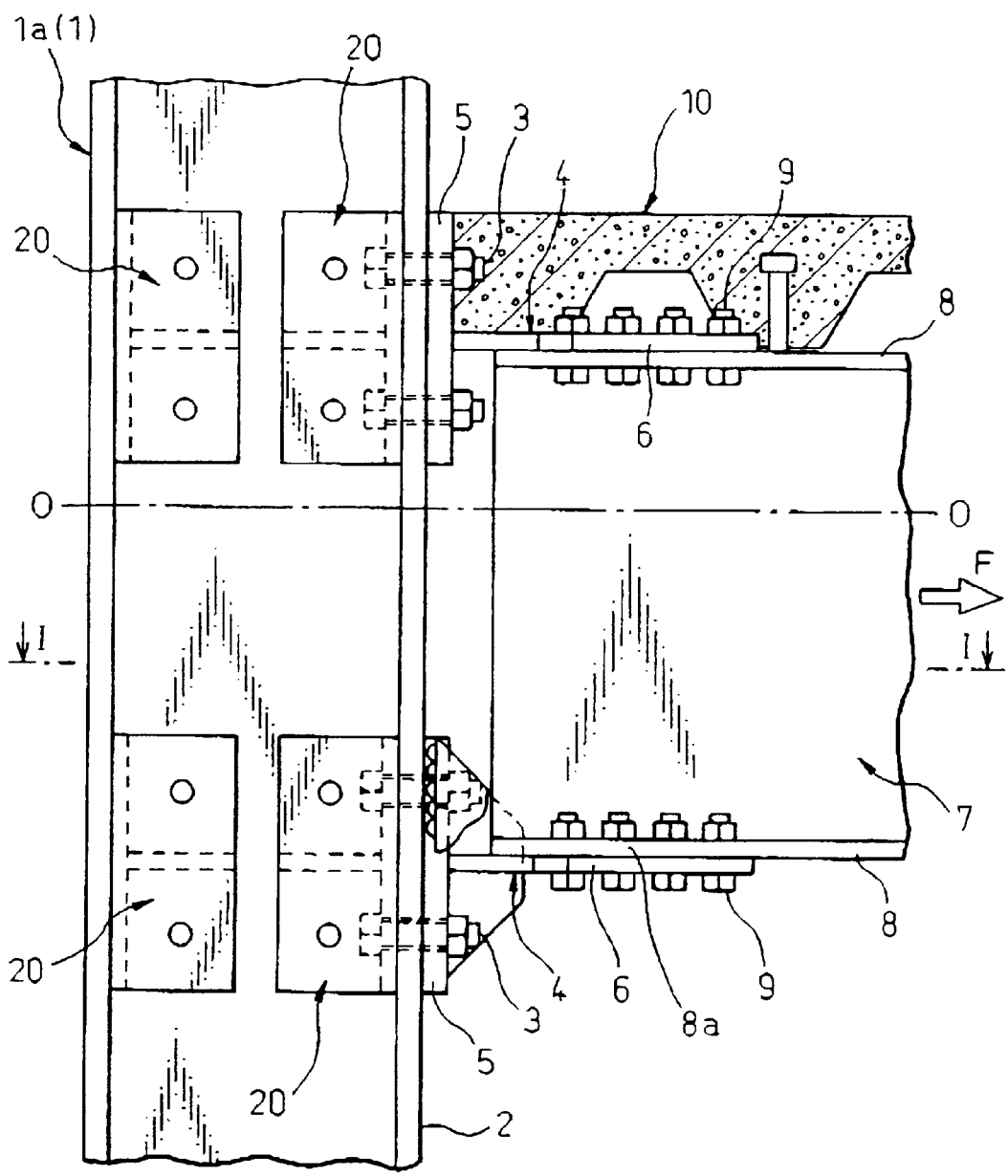
FIG. 1 is a side view of a main part showing the first embodiment of a column-and-beam join structure according to the present invention.
Figure 2:
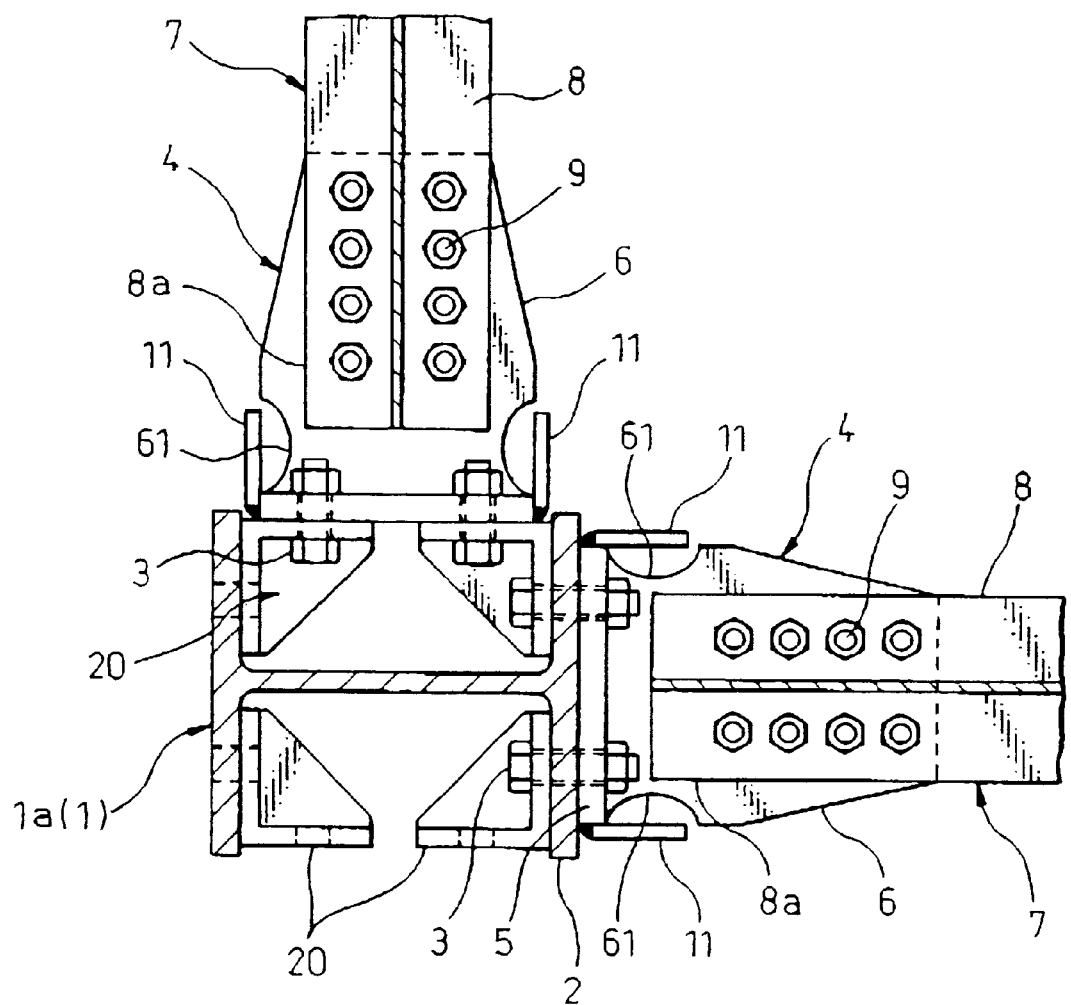
FIG. 2 is a sectional view taken on line I—I of FIG. 1.
Figure 3:
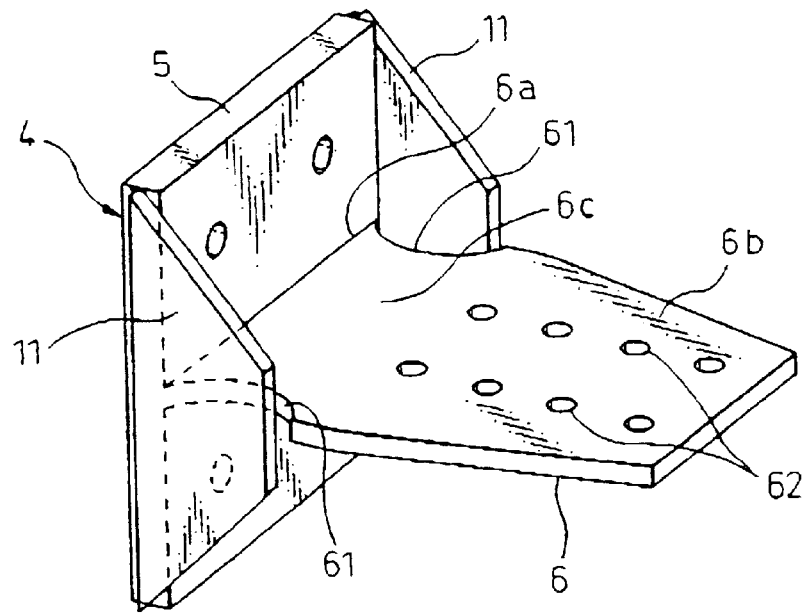
FIG. 3 is an enlarged perspective view of a split tee.

The embodiments of the present invention will be explained in detail, by referring to the drawings, hereunder. FIGS. 1 to 3 show the first embodiment of a column-and-beam join structure according to the present invention.

As shown in FIGS. 1 to 3, an H-shaped steel column 1*a*(1) is used as a steel column 1, the flanges 5 of a pair of upper and lower split tees 4 are connected to a flange 2 of the H-shaped steel column 1*a*(1) using bolts 3, and the end portions 8*a* of both upper and lower flanges 8 of an H-shaped steel beam 7 used as a steel beam are attached between the webs 6 of both the upper and lower split tees 4 and are connected to the webs 6 using bolts 9.

Then, a concrete slab 10 is molded on the upper flange 8 of the H-shaped steel beam 7 as a floor material, and, in this case, a conventional split tee is used as the upper split tee 4 which connects the upper flange 8 of the H-shaped steel beam 7 to a flange 2 of the H-shaped steel column 1*a*(1).

On the other hand, the lower split tee 4 which connects the lower flange 8 of the H-shaped steel beam 7 to a flange 2 of the H-shaped steel column 1*a*(1) is, as shown in FIG. 3, provided with semicircular notches 61 at both side edges of the web 6 extending from the flange 5 to the axial direction (longitudinal direction) of the H-shaped steel beam 7, and, by forming the web notches 61, the cross-sectional area of the web is partially reduced and the base end portion 6*a* of the web 6 is divided from the tip portion 6*b* which is connected to the lower flange 8 of the H-shaped steel beam 7 using bolts 9 through bolt holes 62. The divided portion 6*c* where the cross-sectional area is reduced is plasticized when a compression and a tension are imposed thereon from the join portion of the lower flange 8 of the H-shaped steel beam 7, and can absorb energy caused by an earthquake or the like.

Figure 18A:
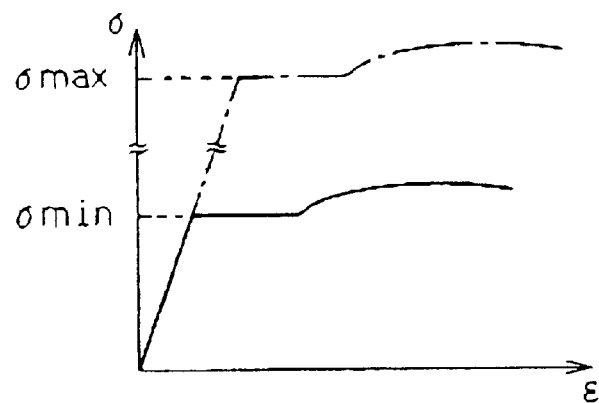
FIG. 18(*a*) is a graph explaining the upper limit and lower limit of a yield stress in the relation between the stress and the strain of a steel material used for a split tee.
Figure 18B:
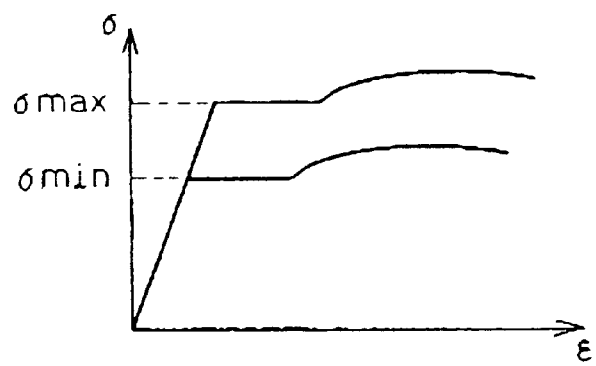
Figure 18C:
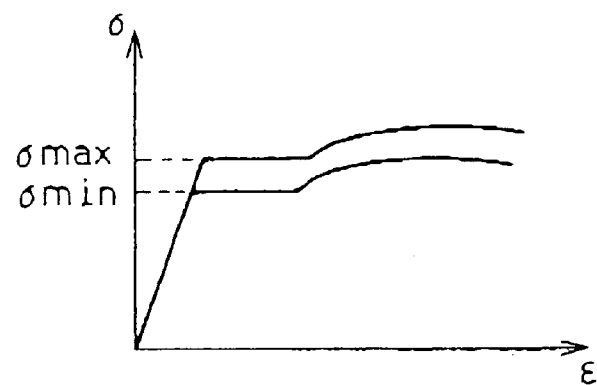
Figure 20:
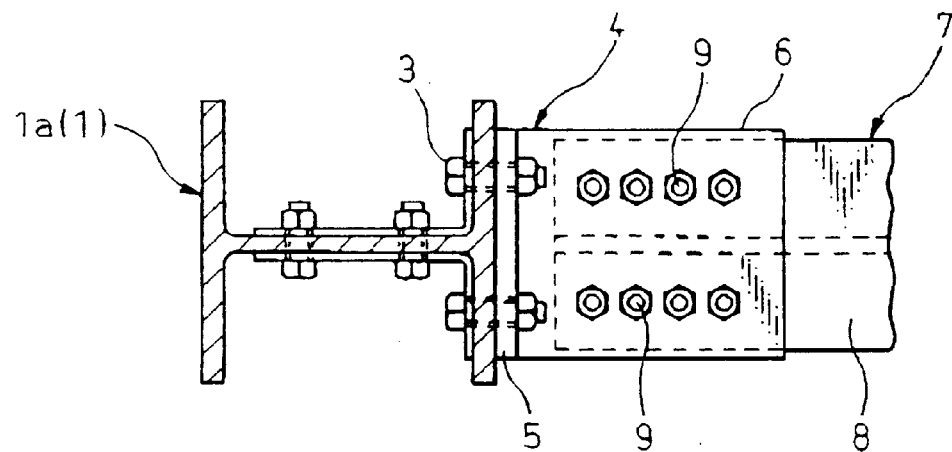
FIG. 20 is a sectional view taken on line V—V of FIG. 19 showing a side view of a main part of a conventional column-and-beam join structure.
Figure 21:
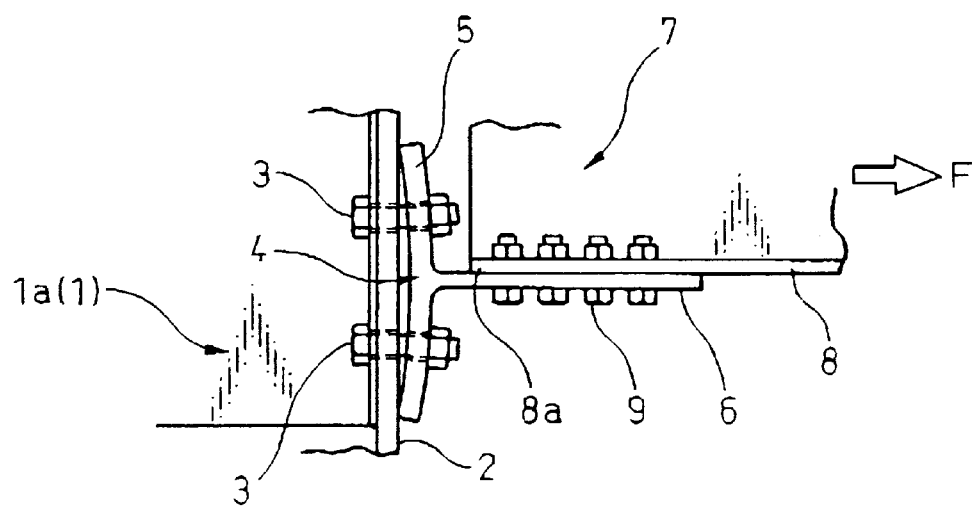
FIG. 21 is a side view showing the state of the bending deformation of the flange of a split tee.

Further, the yield stress of the steel material at the portion 6*c* where the cross-sectional area of the web 6 of the split tee 4 is reduced is, as shown in FIGS. 18(*b*) and 18(*c*), defined so that the upper limit thereof may be not more than twice, preferably not more than 1.3 times, the lower limit, and that makes it possible to absorb energy at the web portion of the split tee 4, to make the plasticization of the web portion precede that of the other flange portions of the beam surely, and to quantify the rotation angle of the beam end. By so doing, the response reduction effect against an earthquake, a wind or the like is enhanced and a collapse at an undesirable portion, such as the tension rupture of bolts which has occurred up to now, is prevented.

In addition, according to the above-mentioned construction, when a concrete slab 10 is molded on the upper flange 8 of the H-shaped steel beam 7, the rigidity of the upper side of the H-shaped steel beam 7 increases and as shown in FIG. 1, the substantial center axis O-O of the H-shaped steel beam 7 moves upward. Because of this, when a tension F is imposed on the H-shaped steel beam 7, the center of the rotation of the H-shaped steel beam 7 is located in the vicinity of the web portion of the upper split tee 4, to which the ends of the upper flange 8 are connected, and the H-shaped steel beam 7 rotates around the center. By so doing, the upper split tee 4 does not rupture, and it becomes possible to use a conventional split tee, having a high yield stress, whose designed proof stress is the lower limit of the yield stress of the steel material. On the other hand, the web portion of the lower split tee 4 where the concrete slab 10 is not molded stretches by the rotation of the H-shaped steel beam 7. Therefore, a split tee consisting of a steel material having a lower yield stress than the upper split tee 4 is used there, and by so doing, even when the split tee is not reusable due to the plasticization caused by a large earthquake or the like, it becomes possible to replace only the lower split tee 4.

Yet further, a pair of right and left trapezoidal reinforcing plates 11, which protrude in the direction of the web 6 in a non-contacting manner, are connected to both side edges of the flange 5 of the lower split tee 4. The reinforcing plates 11 reinforce the flange portion of the lower split tee 4 and make the plasticization of the web portion of the split tee precede that of the other portions further surely.

Figure 4:
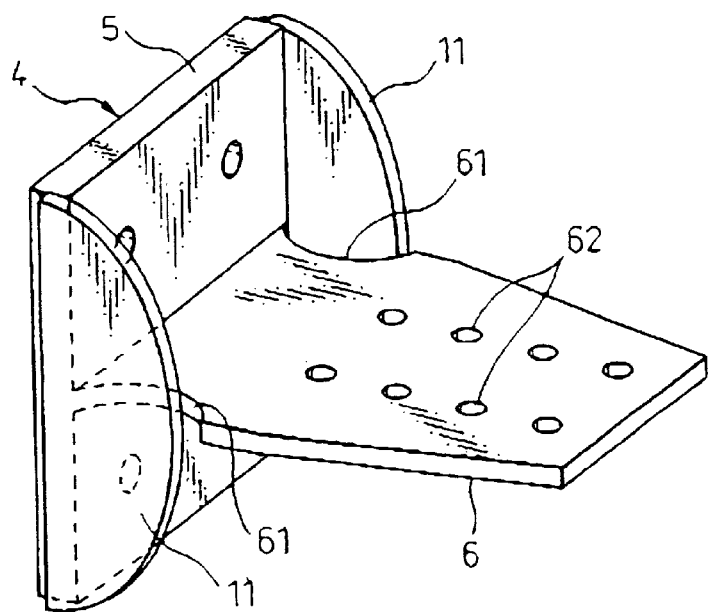
FIG. 4 is an enlarged perspective view of the first modification of a split tee.

FIG. 4 shows the first modification of the above-mentioned split tee. In the first modification, reinforcing plates 11 connected to both side edges of the flange 5 of a split tee 4 are formed into a semicircle shape.

Figure 5:
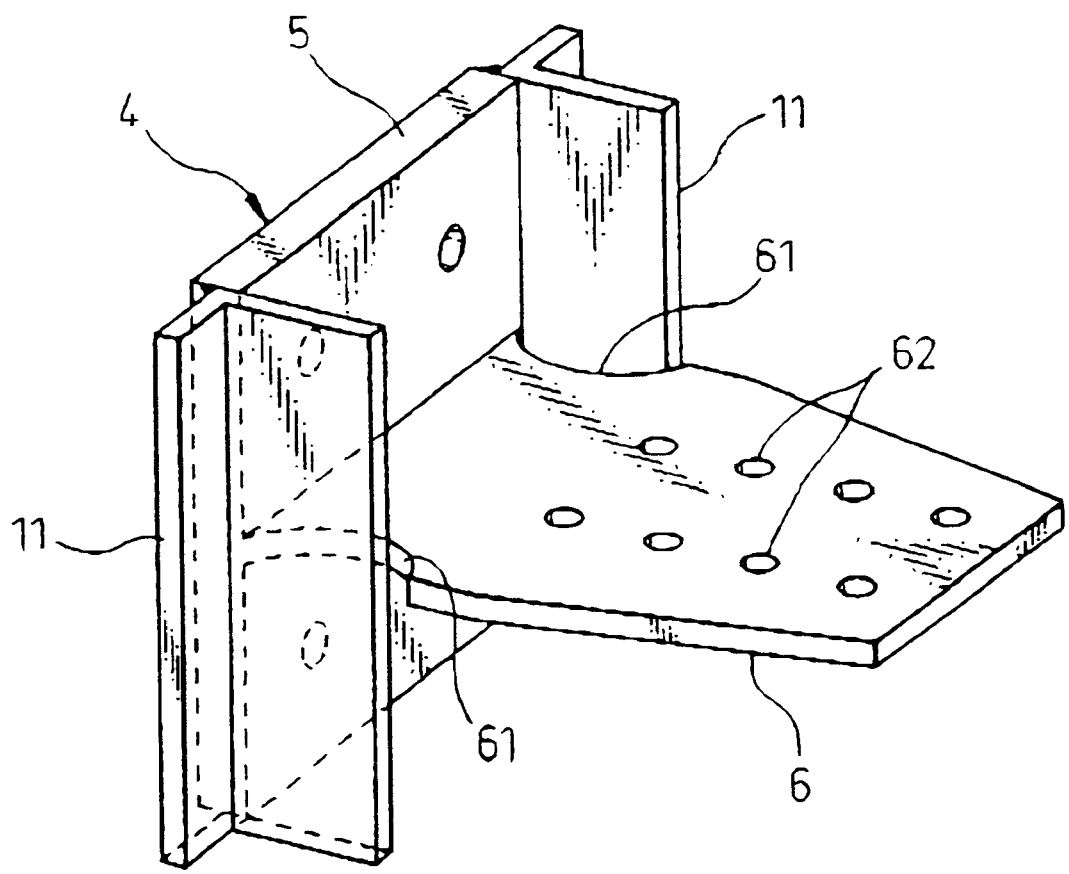
FIG. 5 is an enlarged perspective view of the second modification of a split tee.

FIG. 5 shows the second modification of the above-mentioned split tee. In the second modification, reinforcing plates 11 connected to both side edges of the flange 5 of a split tee 4 are formed into an L-shape.

Figure 6A:
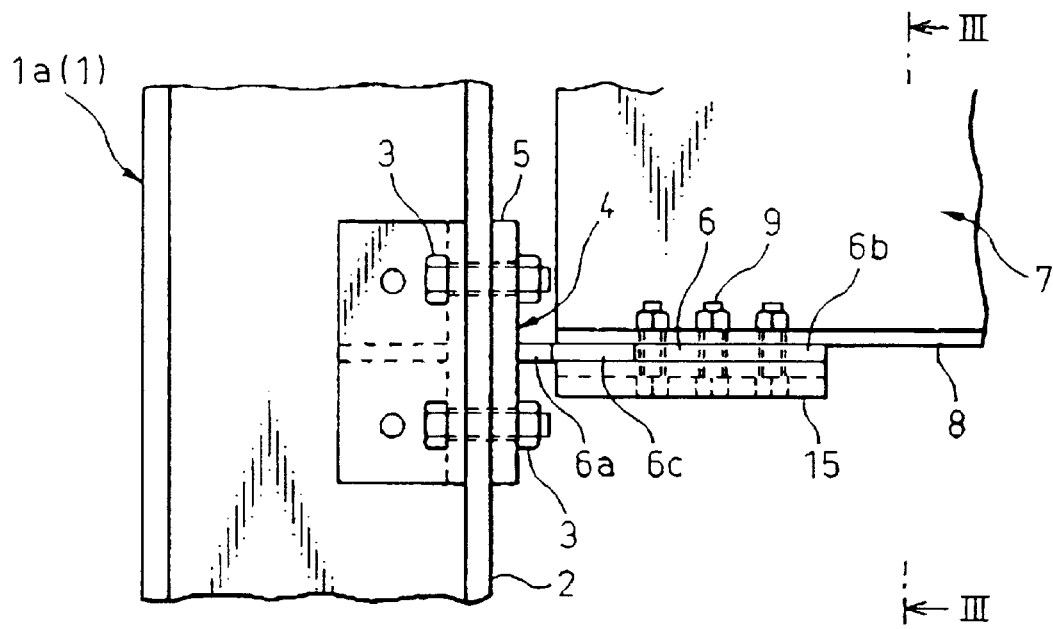
FIG. 6(*a*) is a side view of a main part showing the second embodiment of a column-and-beam join structure according to the present invention.
Figure 6B:
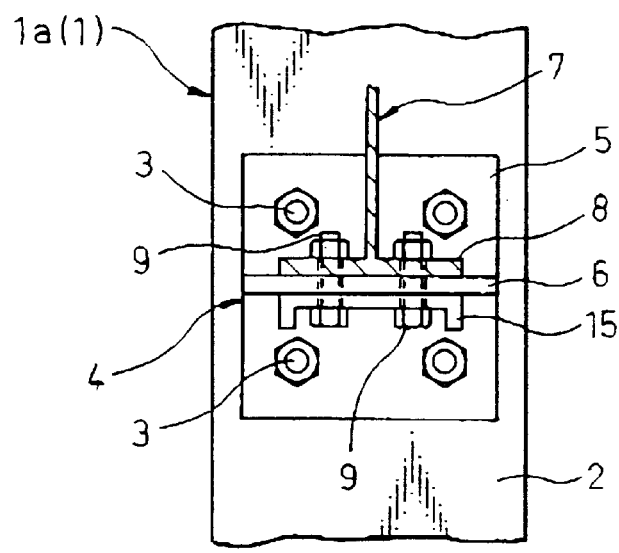

FIGS. 6(a) and 6(b) show the second embodiment of a column-and-beam join structure according to the present invention. In the second embodiment, as shown in FIGS. 6(a) and 6(b), a section steel 15 for buckling restraint having a U-shape in cross section is mounted under the web 6 of the lower split tee 4 in a manner of including the portion 6c where the cross-sectional area of the web is reduced, and the web 6 is placed between the section steel 15 for buckling restraint and the flange 8 of the H-shaped steel beam 7 and is connected to them using bolts 9. By so doing, the portion 6c where the cross-sectional area of the web of the split tee 4 is reduced is reinforced and, when a tension and a compression are imposed on the web 6, the portion 6c where the cross-sectional area of the web is reduced is prevented from buckling locally in an off-plate direction on the compression side.

Figure 7A:
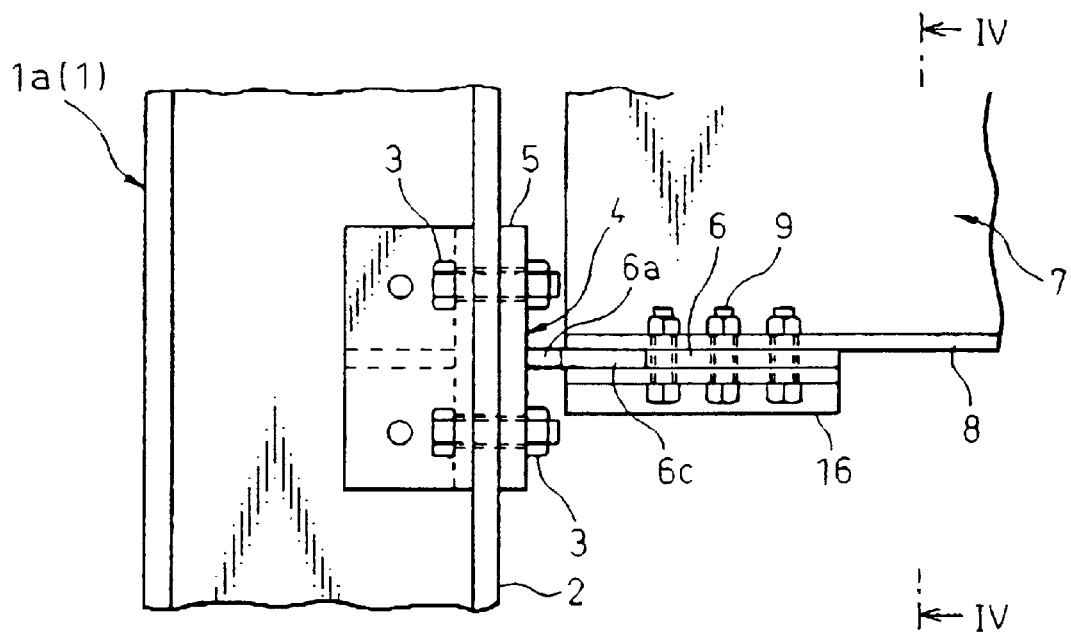
FIG. 7(*a*) is a side view of a main part showing the third embodiment of a column-and-beam join structure according to the present invention.
Figure 7B:
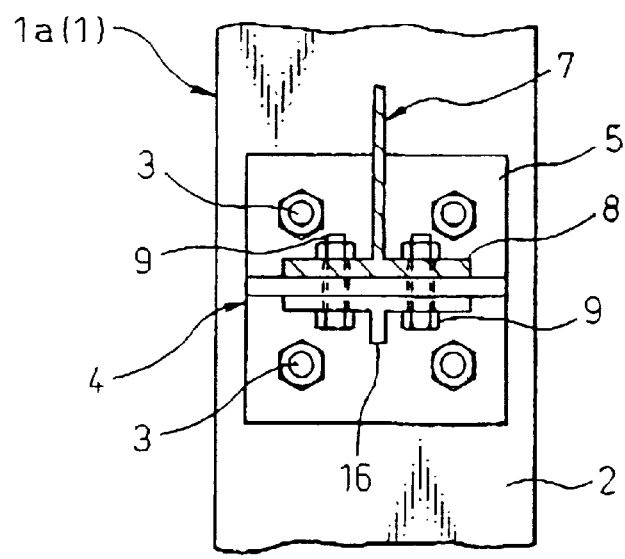

FIGS. 7(a) and 7(b) show the third embodiment of a column-and-beam join structure according to the present invention. In the third embodiment, as shown in FIGS. 7(a) and 7(b), a section steel 16 for buckling restraint having a T-shape in cross section is mounted under the web 6 of the lower split tee 4 in a manner of including the portion 6c where the cross-sectional area of the web is reduced, and the web 6 is placed between the section steel 16 for buckling restraint and the flange 8 of the H-shaped steel beam 7 and is connected to them using bolts 9. By so doing, the portion 6c where the cross-sectional area of the web of the split tee 4 is reduced is reinforced, and, when a tension and a compression are imposed on the web 6, the portion 6c where the cross-sectional area of the web is reduced is prevented from buckling locally in an off-plate direction on the compression side.

Figure 8:
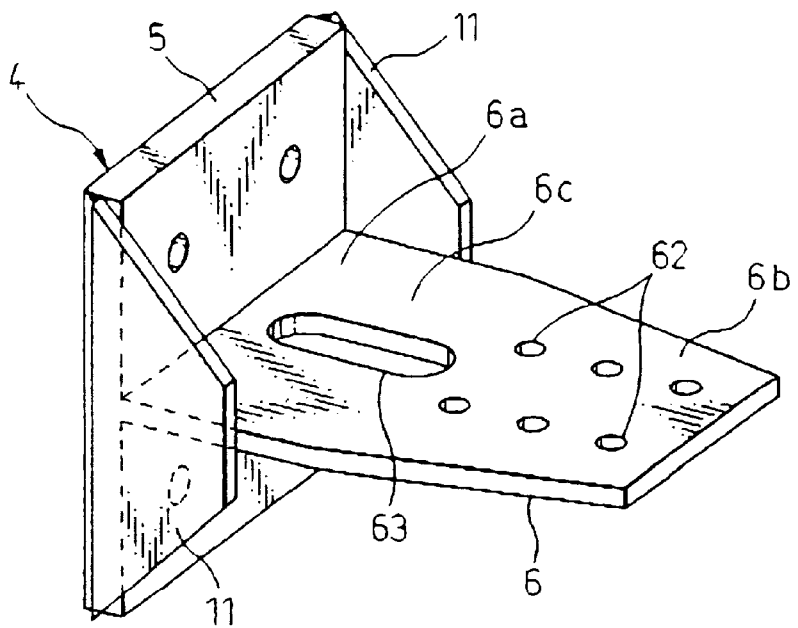
FIG. 8 is an enlarged perspective view showing a modification of the portion where the cross-sectional area of the web of a split tee is partially reduced.
Figure 9:
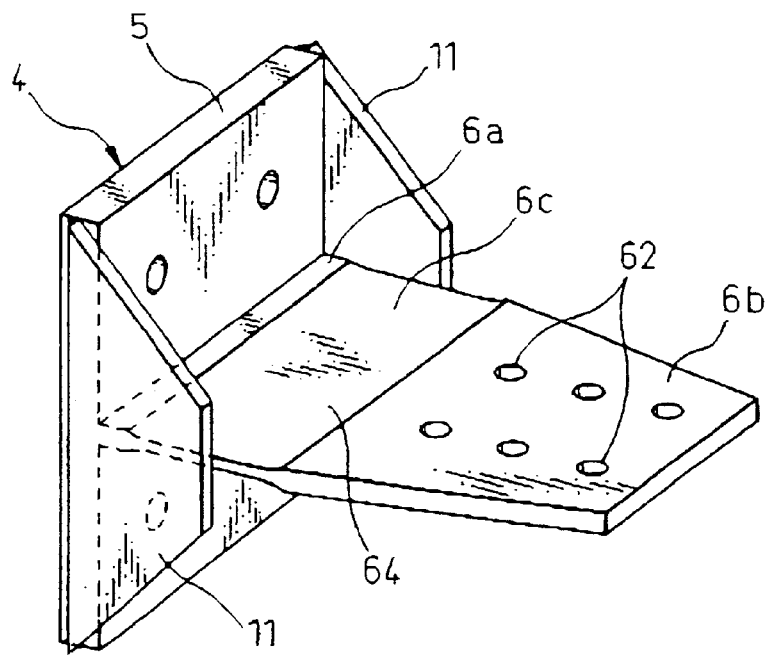
FIG. 9 is an enlarged perspective view showing another modification of the portion where the cross-sectional area of the web of a split tee is partially reduced.

Here, in the above embodiments, though the portion 6c where the cross-sectional area of the web 6 of the split tee 4 is reduced is formed by the notches 61 of a semicircular shape, the shape of the notches is optional. Further, the portion 6c where the cross-sectional area of the web 6 of the split tee 4 is reduced may be formed in the shape of a long hole 63 as shown in FIG. 8 or in the shape of a reduced wall thickness 64 as shown in FIG. 9, and the shape of a long hole 63 or the shape of a reduced wall thickness 64 is also optional. Furthermore, an H-shaped steel column is used as an example of a steel column in the above explanations, a square steel tube column or the like may be used.

Figure 10A:
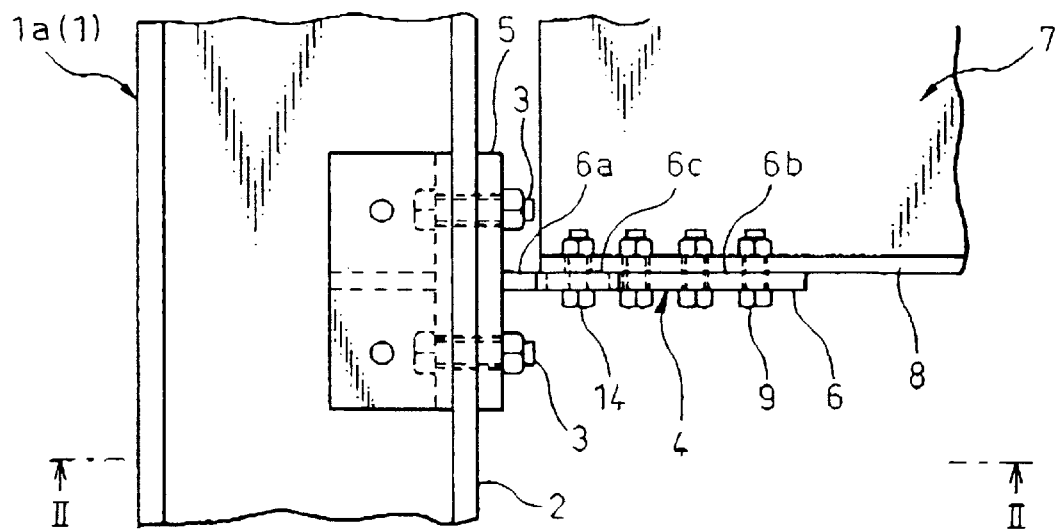
FIG. 10(*a*) is a side view of a main part showing another embodiment of a column-and-beam join structure according to the present invention.
Figure 10B:
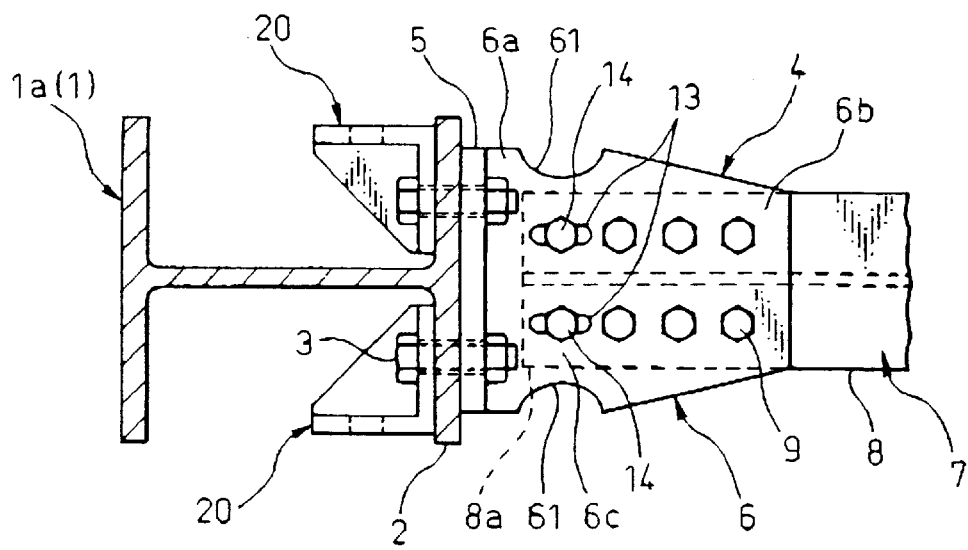

FIGS. 10(a) and 10(b) show another embodiment of a column-and-beam join structure according to the present invention. In the embodiment, as shown in FIGS. 10(a) and 10(b), the portion 6c where the cross-sectional area of the web 6 of the split tee 4 is reduced is provided with loose holes 13 and is connected to the flange 8 of the H-shaped steel beam 7 via washers (not shown in the drawing) using bolts 14. By so doing, the portion 6c, where the cross-sectional area of the web 6 of the split tee 4 is reduced, is reinforced and, when a tension and a compression are imposed on the web 6, the portion 6c where the cross-sectional area of the web 6 is reduced is prevented from buckling locally in an off-plate direction on the compression side.

Figure 11:
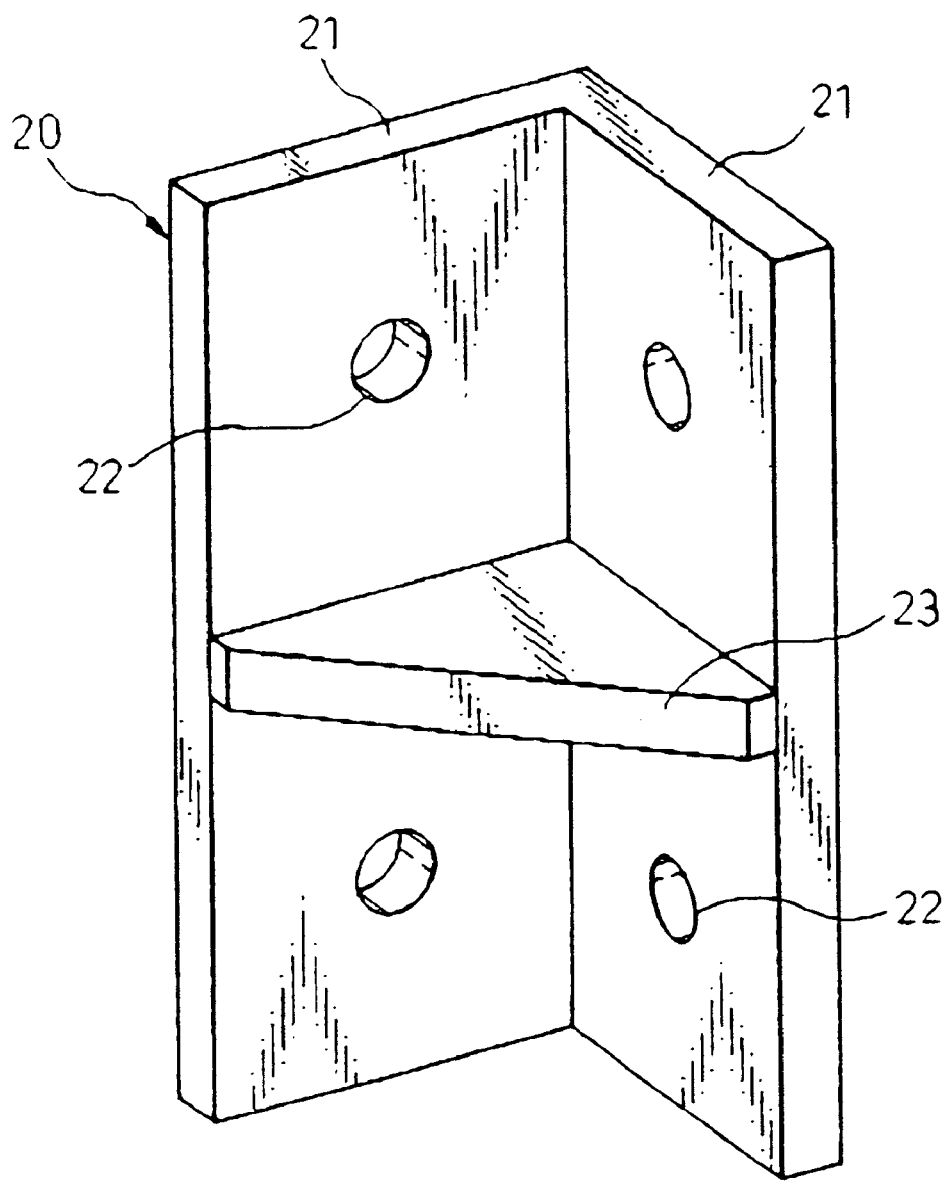
FIG. 11 is an enlarged perspective view showing a reinforcing member to be disposed in an open space of an H-shaped steel column.

In the meantime, when an H-shaped steel column 1a(1) is used as a steel column 1, though the outer surfaces of the two flanges 2 of the H-shaped steel column can be connected to split tees 4 using bolts, two open spaces formed between the two flanges 2 of the H-shaped steel column 1a(1) cannot be connected to split tees 4 using bolts 3. Therefore, as an example to cope with this case, the present invention shows an example of connecting an open space of the H-shaped steel column 1a(1) to a split tee 4 by using reinforcing members 20 made of a steel section having an L-shaped cross section, as shown in FIG. 11. A reinforcing member 20 has bolt holes 22 in both sides 21 of the L-shape and is configured so as to be reinforced with a triangular reinforcing plate 23 disposed in the inside thereof. Then, as shown in FIGS. 1 and 2, a plurality of reinforcing members 20 are disposed at the upper and lower portion of the column 1a(1), so that one of the sides of each reinforcing member 20 may face one of the corner portions of the open spaces of the H-shaped steel column 1a(1), and are connected to the flanges 2 using the bolts 3 which are used for the join of the split tees 4. By so doing, it becomes possible to connect a split tee 4 to an open space of an H-shaped steel column 1a(1) using bolts.

Figure 12A:
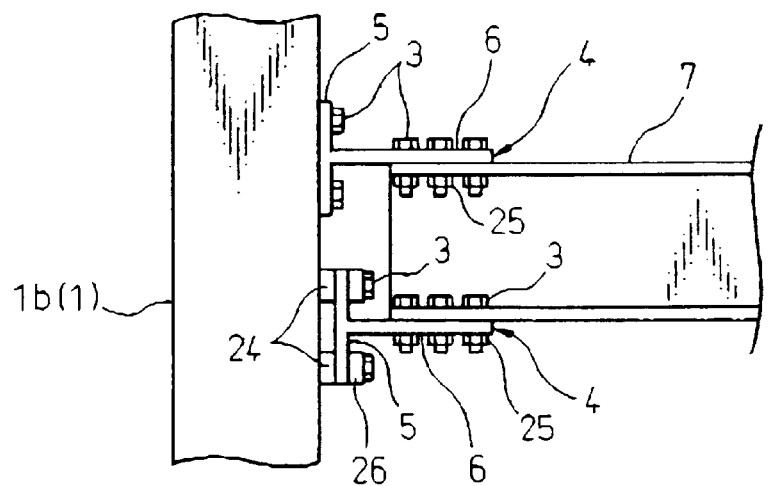
FIG. 12(*a*) is a side view of a main part showing the fourth embodiment of a column-and-beam join structure according to the present invention.
Figure 12B:
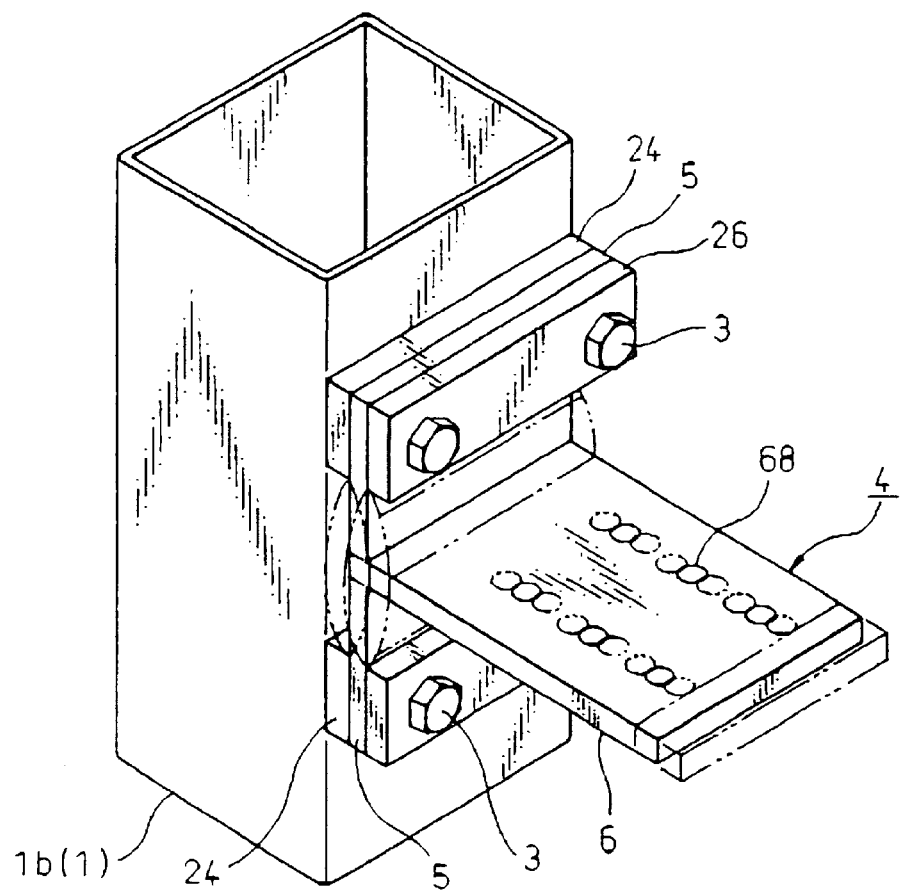

FIGS. 12(a) and 12(b) show the fourth embodiment of a column-and-beam join structure according to the present invention. The fourth embodiment is, as shown in FIGS. 12(a) and 12(b), a column-and-beam join structure composed of a square steel tube column 1b(1) used as a steel column 1 and a steel beam (H-shaped steel beam) 7. A split tee 4 is disposed at each of the upper and lower ends of the H-shaped steel beam 7 used as a steel beam, and the web 6 of a split tee 4 is connected to the H-shaped steel beam 7 using bolts. Then, each of the upper and lower split tees 4 is connected to the square steel tube column 1b(1) at the upper and lower two portions of the flange 5, and the square steel tube column 1b(1) and the H-shaped steel beam 7 are interlinked.

Here, at the lower column-and-beam join portion (one of the upper and lower column-and-beam join portions) of the H-shaped steel beam 7, washer plates 24 (space keeping members) are inserted between the bolt-join portions at the both edges of the flange 5 of a split tee 4 and the bolt-join portions of the steel column 1b(1). Then, presser plates 26 are disposed at the outside of the bolt-join portions of the flange 5 of the split tee 4 and are connected from the outside using bolts.

That is, as shown in FIG. 12(b), the lower column-and-beam join portion is configured so that the washer plates 24 may be inserted at both ends of the flange 5 of the split tee and a space may be formed between the flange 5 and the steel column 1b(1) at the center portion of the flange 5. Therefore, even when an excessive stress is imposed in the direction of compressing the web of the split tee, since a space is formed between the flange 5 of the split tee and the steel column 1b(1), the split tee 4 can absorb energy and the column is not damaged Here, in FIG. 12(b), the state wherein the flange 5 of the split tee is plasticized in the tensile or compressive direction is expressed by the two-dot chain lines.

Further, the steel material used for the flange of the split tee 4 at the lower column-and-beam join portion (one of the upper and lower column-and-beam join portions) is defined so that the upper limit of the yield stress may be not more than twice, preferably not more than 1.3 times, the lower limit. In the present invention, since the flange 5 of the split tee 4 at the lower column-and-beam join portion yields by bending in advance of the bolts 3 used for connecting the flange 5 to the steel column, the H-shaped steel beam 7 or the like, the energy of an earthquake can be absorbed by the plasticization of the flange 5 and also the rotation angle of the beam end can be quantified. By so doing, the response reduction effect against an earthquake, a wind or the like can be enhanced and a collapse at an undesirable portion, such as a tension rupture of bolts, can be prevented.

Further, it is preferable to make the flange 5 of the split tee 4 at the lower column-and-beam join portion yield by bending more surely in advance of the bolts 3 used for connecting the split tee 4 to the steel column, the H-shaped steel beam 7 or the like by partially reducing the cross-sectional area of the flange of the split tee. As specific examples, listed are: (A) the case of reducing the wall thickness of a part of a flange of the split tee as shown in FIGS. 13(a) and 13(b); (B) the case of forming notches at both sides of a flange of the split tee as shown in FIGS. 14(a) and 14(b); (C) the case of forming holes in a flange of the split tee as shown in FIGS. 15(a) and 15(b). Here, the shapes of the wall thickness reduced portion 65, the notches 66 and the holes 67, 68 shown in the drawings can be properly modified.

On the other hand, at the upper column-and-beam join portion (the other of the upper and lower column-and-beam join portions) of the H-shaped steel beam 7, the flange 5 of the split tee 4 is directly connected to the steel column 1b(1) using bolts. The split tee 4 at the upper column-and-beam join portion has a higher yield stress than the upper limit of the yield stress of the split tee 4 at the lower column-and-beam join portion.

That is, according to the present invention, the lower split tee 4 whose yield stress is regulated yields surely by bending in advance of the upper split tee 4 having a high yield stress. Therefore, the damage caused by the energy of an earthquake concentrates on the split tee 4 at the lower column-and-beam join portion in the first place. Accordingly, even when the split tee 4 at the lower column-and-beam join portion becomes unusable after an earthquake, the building can recover its earthquake resistance when the lower split tee 4 is replaced. Further, as the split tee 4 is connected using bolts, the replacement work can be carried out very easily.

Further, a concrete slab may be molded at the upper part of the H-shaped steel beam 7 (the upper face of the beam at the upper column-and-beam join portion) (not shown in the drawing). In this case too, as the split tee 4 which is expected to be replaced is located at the lower side where the concrete slab is not molded, the replacement work of the split tee 4 is not hindered.

Figure 16:
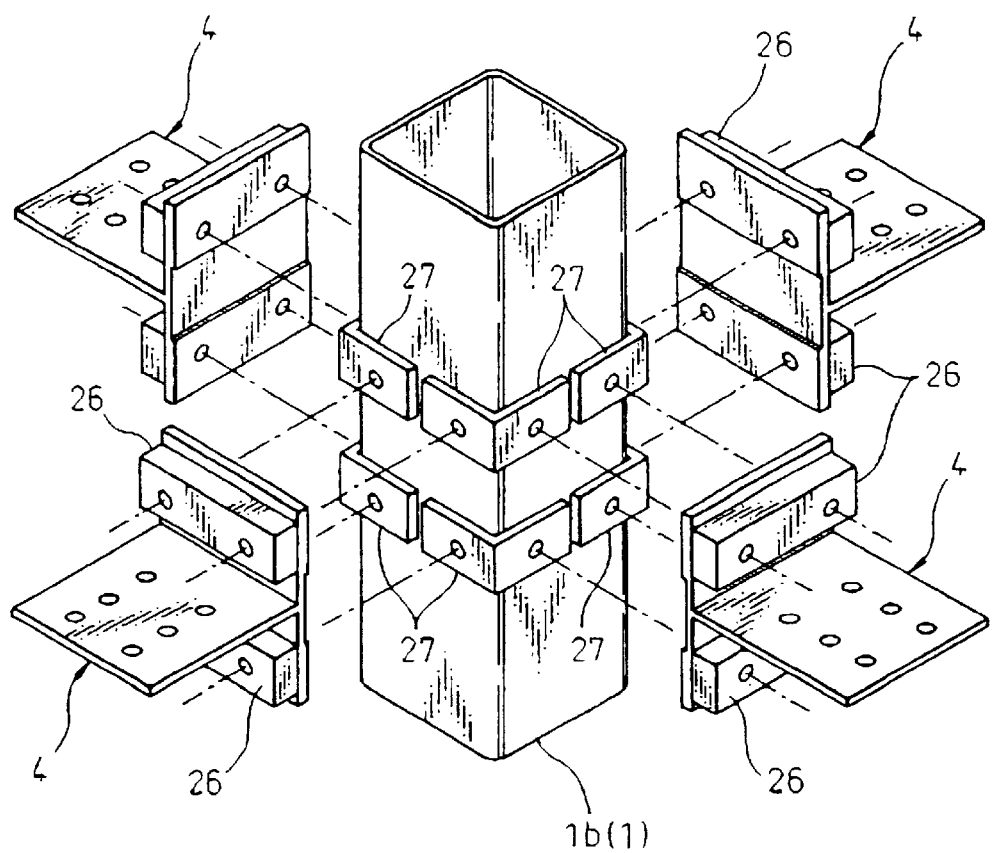
FIG. 16 is a perspective view showing an example of attaching split tees to a square steel tube column at column-and-beam join portions according to the present invention.
Figure 17A:
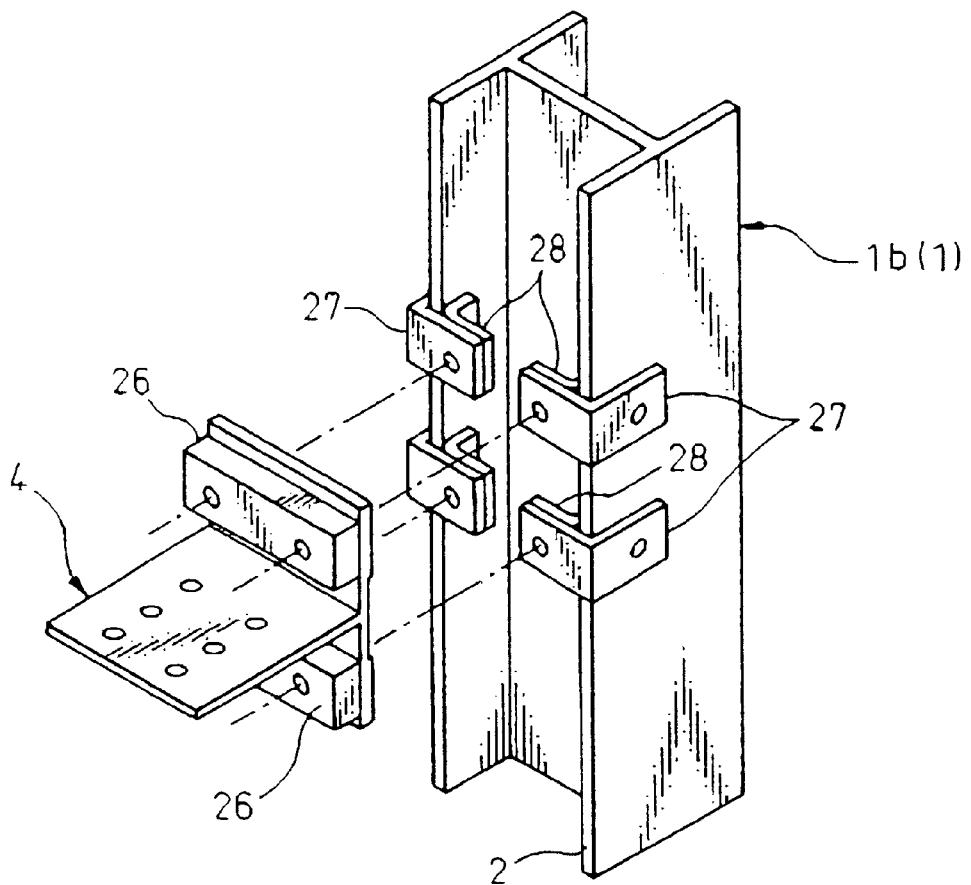
FIG. 17(*a*) is a perspective view showing an example of attaching a split tee between the flanges of an H-shaped steel column at a column-and-beam join portion according to the present invention.
Figure 17B:
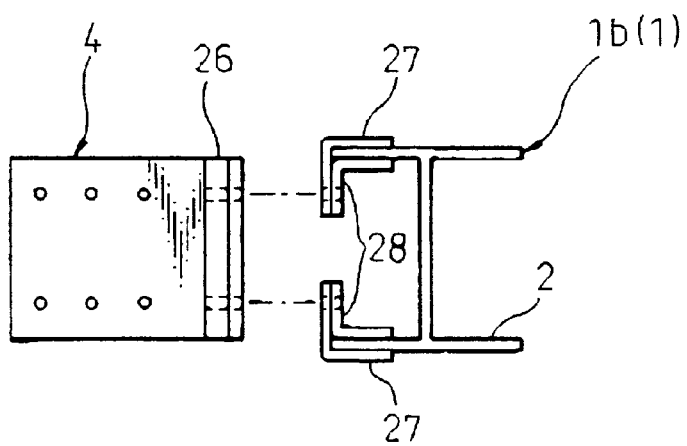

FIGS. 16, 17(a) and 17(b) show examples wherein L-shaped space keeping members 27, each having two faces of the same size, the two faces meeting at a right angle and each face having a bolt hole, are used.

FIG. 16 is a case where a plurality of split tees 4 (four split tees in the drawing) are attached on the four vertical face of a square steel tube column 1b(1) at an equal height. In this example, the above-mentioned L-shaped space keeping members 27 are attached, at upper and lower positions and leaving a space, to each of the four corners of the square steel tube column 1b(1), and the split tees 4 are connected from above the L-shaped space keeping members 27 using bolts.

FIG. 17(a) or FIG. 17(b) is a case where a split tee 4 is attached to an open space between the flanges 2 of an H-shaped steel column 1b(1). In this example, two pairs of L-shaped metal fittings 28, a pair of which facing each other inwardly, are connected, at upper and lower positions and leaving a space, to the inner sides of the flanges of the H-shaped steel column 1b(1). Then, the two pairs of L-shaped space keeping members 27 are disposed from the outside of the flanges of the H-shaped steel column 1b(1) in a manner of overlapping the L-shaped metal fittings 28, and the split tee 4 is connected from above the L-shaped space keeping members 27 using bolts.

In a column-and-beam join structure according to the present invention, when an excessive stress, such as a compression and/or a tension, is imposed on the beam caused by an earthquake, wind or the like, the web or the flange of a split tee plasticizes surely in advance of the bolts, which are used for connecting the split tee to a steel column, and a steel beam. By the plasticization of the split tee, the energy of an earthquake, wind or the like is absorbed and the response reduction effect against the earthquake, the wind or the like can be enhanced. Therefore, the column and the beam are hardly damaged.

Further, in a column-and-beam join structure according to the present invention, as the web or the flange of a split tee plasticizes surely in advance of the bolts, which are used for connecting the split tee to a steel column, and a steel beam, as stated above, the rotation angle of the beam end can be quantified and the split tee ruptured by an earthquake or the like can be replaced easily. As a result, a collapse at an undesirable portion, such as the tension rupture of bolts which has occurred up to now, can be prevented Yet further, in a column-and-beam join structure according to the present invention, since the range of the yield stress of a split tee is narrow, the cross-sectional area of a column and a beam can be reduced and therefore an economical design can be realized.

Furthermore, in a column-and-beam join structure according to the present invention, even when the portion of the web or the flange of a split tee, where the cross-sectional area is reduced, absorbs energy caused by an earthquake or the like and, after that, the portion which has absorbed the energy, becomes unusable, as the split tee is connected using bolts, it can be replaced easily and the building can recover its earthquake resistance.

In addition, in a column-and-beam join structure according to the present invention, since welding is not applied to the portion where a column is connected to a split tee and the portion of a split tee where energy is absorbed, a brittle fracture during a large earthquake can be avoided and a building having high earthquake resistance can be constructed.

What is claimed is:

1. A column-and-beam join structure comprising:
   a steel column and a steel beam, said steel beam having first and second flanges with ends of the first and second flanges of said steel beam adjacent to said steel column;
   a pair of split tees comprising a first split tee and a second split tee, with each split tee having a flange and a web;
   said flange of each split tee connected to said steel column by bolts;
   wherein the web of each split tee has a base end portion adjacent to the flange of the split tee, an opposite tip end portion axially spaced from the base end position, and a divided portion located between the base end portion and the tip end portion;
   said web of said first split tee connected to the end of said first flange of said steel beam by bolts at the tip end portion of said web of said first split tee;
   said web of said second split tee connected to the end of said second flange of said steel beam by bolts at the tip end portion of said web of said second split tee;
   wherein for either one or both of said first split tee and said second split tee, the divided portion of the web has a cross-sectional area smaller than the cross-sectional area of the base end portion of the web adjacent to the divided portion and smaller than the cross-section area of the tip end portion of the web adjacent to the divided portion.

2. A column-and-beam join structure according to claim 1:
   wherein the divided portion of the web of the split tee having the smaller cross-sectional area is a steel material having an upper limit of yield stress not more than twice a lower limit of yield stress of said steel material.

3. A column-and-beam join structure according to claim 1:
   wherein a buckling restraining steel section is connected by bolts to the web of either one or both of said first split tee and said second split tee on a surface of said web of a respective split tee not contacting a respective flange of said steel beam.

4. A column-and-beam join structure comprising:
   a steel column and a steel beam, said steel beam having upper and lower flanges with ends of the upper and lower flanges of said steel beam adjacent to said steel column;
   a pair of split tees comprising an upper split tee and a lower split tee, with each split tee having a flange and a web;
   said flange of each split tee connected to said steel column by bolts;
   said web of said upper split tee connected to the end of said upper flange of said steel beam by bolts;
   said web of said lower split tee connected to the end of said lower flange of said steel beam by bolts;
   a concrete slab disposed on one of the upper flange or the lower flange of said steel beam;
   the web of the split tee connected to the flange of the steel beam having the concrete slab disposed thereon being a steel material with a yield stress higher than an upper limit of yield stress of a steel material of the web of the split tee connected to the flange of the steel beam not having the concrete slab disposed thereon;
   said upper limit of the yield stress of the steel material of the web of the split tee connected to the flange of the steel beam not having the concrete slab disposed thereon being not more than twice a lower limit of the yield stress of the steel material of the web of the split tee connected to the flange of the steel beam not having the concrete slab disposed thereon;
   said web of the split tee connected to the flange of the steel beam not having the concrete slab disposed thereon has a shape wherein cross-sectional area of said web is partially reduced;
   said web of the split tee having said partially reduced cross-sectional area being connected to the flange of the steel beam not having the concrete slab disposed thereon at a portion wherein cross-sectional area of the web of said split tee is not partially reduced.

5. A column-and-beam join structure comprising:
   a steel column and a steel beam, said steel beam having first and second flanges with ends of the first and second flanges of said of said steel beam adjacent to said steel column;
   a pair of split tees comprising a first split tee and a second split tee, with each split tee having a flange and a web;
   said flange of each split tee connected to said steel column by bolts;
   said web of said first split tee connected to the end of said first flange of said steel beam by bolts;
   said web of said second split tee connected to the end of said second flange of said steel beam by bolts;
   one of said first and said second split tees having a web with a shape wherein cross-sectional area of said web is partially reduced;
   said web of said split tee having said partially reduced cross-sectional area being a steel material having an upper limit of yield stress not more than twice a lower limit of the yield stress of said steel material;
   said web of said split tee not having said partially reduced cross-sectional area being a steel material having a yield stress higher than the upper limit of the yield stress of the steel material of the web of said split tee having said partially reduced cross-sectional area;
   said web of said split tee having said partially reduced cross-sectional area being connected to the flange of said steel beam at a portion wherein cross-sectional area of the web of said split tee is not partially reduced.

6. A column-and-beam join structure according to claim 5:
   wherein a buckling restraining steel section is connection by bolts to the web of the split tee having the partially reduced cross-sectional area on a surface of said web not contacting the flange of said steel beam.

* * * * *